(12) United States Patent
Cavaliere et al.

(10) Patent No.: US 10,141,970 B2
(45) Date of Patent: Nov. 27, 2018

(54) TRANSCEIVER CIRCUIT AND METHODS FOR TUNING A COMMUNICATION SYSTEM AND FOR COMMUNICATION BETWEEN TRANSCEIVERS

(71) Applicant: ams AG, Unterpremstaetten (AT)

(72) Inventors: Francesco Cavaliere, Graz (AT); Tibor Kerekes, Budapest (HU); Mauro Afonso Perez, Valencia (ES)

(73) Assignee: ams AG, Unterpremstaetten (AT)

( * ) Notice: Subject to any disclaimer, the term of this patent is extended or adjusted under 35 U.S.C. 154(b) by 0 days.

(21) Appl. No.: 15/521,601

(22) PCT Filed: Oct. 19, 2015

(86) PCT No.: PCT/EP2015/074108
§ 371 (c)(1),
(2) Date: Apr. 24, 2017

(87) PCT Pub. No.: WO2016/066458
PCT Pub. Date: May 6, 2016

(65) Prior Publication Data
US 2017/0244441 A1    Aug. 24, 2017

(30) Foreign Application Priority Data
Oct. 28, 2014   (EP) .................................. 14190651

(51) Int. Cl.
*H04L 25/02* (2006.01)
*H04B 1/40* (2015.01)

(52) U.S. Cl.
CPC ............. *H04B 1/40* (2013.01); *H04L 25/028* (2013.01); *H04L 25/0266* (2013.01);
(Continued)

(58) Field of Classification Search
CPC ..... H04B 1/40; H04L 25/0266; H04L 25/028; H04L 25/0292; H04L 25/02929; H04L 25/076; H04L 25/0272
See application file for complete search history.

(56) References Cited

U.S. PATENT DOCUMENTS 6,819,169 B1    11/2004   Kunc et al.
7,724,815 B1 *  5/2010   Raha ........................ H03H 7/38
                                              375/219
(Continued)

FOREIGN PATENT DOCUMENTS

| DE | 10020142 A1 * | 11/2001 | ....... H04L 12/40013 |
| EP | 0588554 A2 * | 3/1994 | ......... H04L 25/0278 |
| WO | 2005025064 A2 | 3/2005 | |

OTHER PUBLICATIONS

"Advantages of AC-Coupling in SerDes Applications"; http://www.maximintegrated.com/en/app-notes/index.mvp/id/4085; pp. 1-6; downloaded May 5, 2015, 10:44.

*Primary Examiner* — Syed Haider
(74) *Attorney, Agent, or Firm* — Fish & Richardson P.C.

(57) ABSTRACT

A transceiver circuit with a front-end and a back-end is provided. The front-end has terminals for coupling to a first and a second capacitor and tunable resistors coupled between the terminals and a reference terminal. The front-end is configured to receive receiver signals at the terminals utilizing a first setting for the resistors. The front-end is configured to generate a receiver data packet based on the receiver signals. The back-end is configured to check the receiver data packet for errors with respect to a defined tuning data packet. If an error is found, the back-end sets the resistors to a default setting. If no errors are found, the back-end sets the resistors to a second setting.

19 Claims, 5 Drawing Sheets

(52) U.S. Cl.
CPC ...... *H04L 25/0272* (2013.01); *H04L 25/0276* (2013.01); *H04L 25/0292* (2013.01)

(56) References Cited

U.S. PATENT DOCUMENTS

| | | | |
|---|---|---|---|
| 2007/0115070 A1* | 5/2007 | Tu | H03H 11/0433 331/36 C |
| 2009/0160479 A1* | 6/2009 | Lange | H04L 25/0298 326/30 |
| 2012/0134394 A1* | 5/2012 | Allen | H04L 7/0008 375/219 |
| 2015/0180341 A1* | 6/2015 | Yuan | H02M 3/156 323/271 |

* cited by examiner

TRANSCEIVER CIRCUIT AND METHODS FOR TUNING A COMMUNICATION SYSTEM AND FOR COMMUNICATION BETWEEN TRANSCEIVERS

BACKGROUND OF THE INVENTION

The present disclosure relates to a transceiver circuit, to a method for tuning resistor settings of a communication system, in particular a communication system with two capacitively coupled transceivers, and to a method for communication between two capacitively coupled transceivers.

In modern communication systems, communication channels between a transceiver sending data and a transceiver receiving the data can be implemented by means of capacitive coupling, also known as AC coupling. In particular, in systems where the transceivers are attached to mobile devices and therefore the coupling is necessarily detachable, capacitive coupling may be more suitable than for example an ohmic coupling.

In a detachable capacitively coupled communication system, capacitance values between the transceivers may undergo variations, for example due to variations of distances or orientations of capacitor plates establishing the capacitive coupling, environmental parasitics or other variations.

On the receiver parts of the transceivers, commonly resistors form the capacitive coupling together with the capacitors. Therein, the resistors commonly have fixed resistance values. Due to the variations in the capacitances, for the fixed resistance values, a transceiver may be not capable of receiving a data package without errors. As a result, and also due to possible clock mismatches, a synchronization between the transceivers may be lost. This may be particularly relevant if self-clocking signals are to be transmitted. The de-synchronization may for example increase during data transmission and communication failures may occur. Furthermore, the variations in the capacitances may be different for different applications and/or environmental conditions.

SUMMARY OF THE INVENTION

The present disclosure provides an improved concept for transceivers and communication systems that allows for an improved tuning of resistor settings.

According to the improved concept, transceivers of a communication system contain tunable resistors and are operated in a tuning mode of operation, during which several resistor settings are checked with respect to errors they may cause when data are received. Therein, tuning signals are transmitted from one transceiver to the other. For receiving corresponding receiver signals, one resistor setting after another is selected from a plurality of settings. Then, a receiver data packet is generated and checked for errors. Depending on whether an error is found, the next setting of the plurality is chosen and checked or, if an error is found, a default setting is chosen. By choosing the default setting, for example a re-synchronization of the transceivers may be ensured.

According to the improved concept, a transceiver circuit is provided. The transceiver circuit comprises a front-end and a back-end. The front-end comprises a first terminal and a second terminal for coupling to a first capacitor and to a second capacitor, respectively. The front-end further comprises a tunable first resistor coupled between the first terminal and a reference terminal and a tunable second resistor coupled between the second terminal and the reference terminal.

The transceiver circuit is configured to operate in a tuning mode of operation. The front-end is configured to, during the tuning mode, receive receiver signals at the first and the second terminal utilizing a first setting for the first and the second resistor. The front-end is also configured to generate a receiver data packet based on the receiver signals.

The back-end is configured to check the receiver data packet for errors with respect to a defined tuning data packet, during the tuning mode. If an error is found by means of the checking, the back-end sets the first and the second resistor to a default setting. If no errors are found by means of the checking, the back-end sets the first and the second resistor to a second setting.

The first setting and the second setting may or may not be equal to the default setting. The default setting is determined upfront during a discovery mode of operation. When determining the default setting, it is ensured that a checking of the receiver data packet for errors with respect to a defined tuning data packet does not find an error if the first setting is equal to the default setting. The default setting may for example be determined based on an estimated range of variations in capacitances of the first and the second capacitor. For example, based on an estimated average of the capacitances and on an estimated desired value for a time constant, for example a discharge time, corresponding to the capacitive coupling, resistance values corresponding to the default setting may be calculated.

In the context of the present disclosure, a setting for resistors corresponds to resistance values for the resistors. A setting for the first and the second resistor corresponds to a resistance value of the first resistor and a resistance value of the second resistor. The resistance value of the second resistor may or may not be equal to the resistance value of the first resistor.

The transceiver circuit may for example be coupled to a further transceiver circuit via the first and the second capacitor. Then, the receiver signals may for example be based on tuning signals generated by the further transceiver and transmitted to the transceiver circuit via the first and second capacitor. The further transceiver circuit may for example generate the tuning signals based on a tuning data packet. The tuning signals may for example be self-clocking signals and/or non-return-to-zero signals.

The first and the second capacitors may be formed by external capacitor plates. A first plate of the first capacitor and a first plate of the second capacitor may for example be comprised by a first device that may comprise also the transceiver circuit. A second plate of the first capacitor and a second plate of the second capacitor may be comprised by a second device comprising also the further transceiver circuit. The first and the second device may be used independently of each other and may be brought together to form a capacitive coupling via the first and the second capacitor. The capacitive coupling is for example detachable in the sense that by removing the first from the second device also the first plates of the first and second capacitor are removed from the second plates of the first and second capacitor.

The first and/or the second device may for example be mobile electronic devices, for example mobile or cordless telephones, tablets, laptop computers or other mobile devices. For example, one or both of the first and second device may also be implemented as a stationary electronic devices, for example a docking station, a personal computer or an interface device. Other examples of applications comprise industrial connectors or connectors in robotics, automotive or aerospace industry for example.

The first and the second tunable resistors may for example be implemented as adjustable resistors, programmable resistors, resistor decades containing several individual resistors, potentiometers or other types of tunable resistors.

The first setting, the second setting and the default setting may for example be comprised by a plurality of settings. Then, the front-end and the back-end are configured to carry out the receiving of the receiver signals, the generation of the receiver data packet, the checking of the receiver data packet and the setting of the first and the second resistor to the default setting or to the second setting repeatedly in a cyclic manner.

Therein, in an initial cycle, the first setting may be equal to the default setting. During subsequent cycles the first setting may be equal to the second setting of the respective preceding cycle. Such a selection of the second setting may be carried out until all settings of the plurality of settings have been used as the first setting. If all settings of the plurality have been used as the first setting, the default setting may be chosen as the first setting.

Thereby, it may be checked for all settings of the plurality of settings if they are suitable for receiving the receiver signals without causing an error in the checking of the receiver data packet respect to the tuning data packet. The back-end may set a used flag for the respective setting after the receiver signals have been received. In this way, it may be ensured that each setting of the plurality is checked exactly once. Analogously, also the further transceiver circuit may be tuned. In such a case, the transceiver circuit and the further transceiver circuit may switch their roles after each cycle.

A result of each checking of the receiver data packet may be stored by the back-end. In this way, the back-end may choose a suitable, in particular an optimal, setting of the plurality of settings for example for operating in a normal mode of operation.

By means of the setting of the first and the second resistor to the default setting if an error is found by the checking of the receiver data packet, it may be ensured that a synchronization between the transceiver circuit and the further transceiver circuit is re-established.

The checking of the receiver data packet for errors may for example be carried out by a direct comparison of the receiver data packet with the tuning data packet. Alternatively or in addition, the checking may be carried out by means of cyclic redundancy checking, CRC.

According to several implementations of the transceiver circuit, the front-end further comprises a first comparator and a second comparator. The first comparator comprises a first non-inverting input coupled to the first terminal and a first inverting input coupled to the second terminal. The first comparator is configured to generate a first comparator signal at a first comparator output, depending on the receiver signals.

The second comparator comprises a second non-inverting input coupled to the second terminal and a second inverting input coupled to the first terminal. The second comparator is configured to generate a second comparator signal at a second comparator output depending on the receiver signals. The first and the second comparator output may for example be inverting outputs. The front-end is configured to generate the receiver data package based on the first comparator signal and on the second comparator signal.

By means of such an arrangement, the first and the second comparator may be enabled to effectively detect a differential portion of the receiver signals and to reject a common-mode portion of the receiver signals.

In several implementations of the transceiver circuit, the front-end further comprises a combining flip-flop, configured and arranged to generate the receiver data packet by generating a receiver output signal based on the first and the second comparator signal. The combining flip-flop is configured to supply the receiver output signal to the back-end.

According to some implementations of the transceiver circuit, the front-end further comprises a discharge detector. The discharge detector is configured and arranged to generate, based on the first and the second comparator signal, a discharge signal. The discharge signal indicates a ratio between a bit period of the tuning data packet and a discharge time of a capacitive coupling established by the first and the second capacitor and the first and the second resistor.

Depending on capacitances of the first and the second capacitor as well as on resistances of the first and the second resistor, the first and the second capacitors feature a certain discharge time. The discharge time may be defined as a time the first and/or the second capacitor need to discharge from an upper charge level to a lower threshold level. Therein, the threshold level may depend on the first and the second comparator. For example, the threshold level may correspond to a minimum voltage difference that may be resolved reliably by the first and the second comparator.

On the other hand, the tuning data package features a bit period corresponding to a minimum time period for a logic high value or a logic low value. In other words, the bit period corresponds to the period of a logic high or low state for a single high or low bit, respectively. The discharge signal may then for example indicate whether the discharge time is shorter or longer then the bit period. For example, the discharge signal may feature a logic high value if the discharge time is shorter than the bit period and may feature a logic low value if the discharge time is longer than the bit period, or vice versa.

In such implementations the back-end may choose a suitable, in particular an optimal, setting of the plurality of settings for example for operating in the normal mode of operation depending for example also on the discharge signal.

In several implementations of transceiver circuit, the discharge detector comprises a first flip-flop, a second flip-flop and a gate, in particular a logic gate.

The first flip-flop comprises a first data input for receiving a delayed first comparator signal and a first clock input for receiving a first clock signal. The first flip-flop is configured to generate a first flip-flop signal based on the first clock signal and the delayed first comparator signal. The second flip-flop comprises a second data input for receiving a delayed second comparator signal and a second clock input for receiving a second clock signal. The second flip-flop is configured to generate a second flip-flop signal based on the second clock signal and the delayed second comparator signal.

The first and the second delayed comparator signals may be delayed versions of the first and the second comparator signals, respectively. The first and the second clock signals may be inverted versions of the second and the first comparator signals, respectively.

The gate is configured and arranged to generate a result signal based on the first and the second flip-flop signal. The gate may for example be implemented as an inverted-or-gate, that is a NOR gate.

In several implementations of the transceiver circuit, the discharge detector further comprises a first delay element coupled between the first comparator output and the first data input and configured to generate the delayed first comparator signal by delaying the first comparator signal. The discharge detector comprises also a second delay element coupled between the second comparator output and the second data input and configured to generate the delayed second comparator signal by delaying the second comparator signal.

According to some implementations of the transceiver circuit, the discharge detector further comprises a first discharge inverter coupled between the second comparator output and the first clock input and configured to generate the first clock signal by inverting the second comparator signal. The discharge detector also comprises a second discharge inverter coupled between the first comparator output and the second clock input and configured to generate the second clock signal by inverting the first comparator signal.

In some implementations of the transceiver circuit, the discharge detector further comprises a third flip-flop with a third data input for receiving the result signal and a third clock input for receiving a sample signal from the back-end. The third flip-flop is configured to generate the discharge signal based on the result signal and the sample signal.

According to the improved concept, also a method for tuning resistor settings of a communication system is provided. The communication system comprises a first transceiver and a second transceiver, the first and the second transceiver being coupled to each other via a first capacitor and a second capacitor. The first transceiver has a tunable first resistor coupled to the first capacitor and a tunable second resistor coupled to the second capacitor.

The method comprises operating the first and the second transceiver in a tuning mode of operation. During the tuning mode of operation, tuning signals representing a tuning data packet are generated by means of the second transceiver. Receiver signals are received by means of the first transceiver utilizing a first setting for the first and the second resistor. The receiver signals depend on the tuning signals. A receiver data packet is generated based on the receiver signals. Then, the receiver data packet is checked for errors with respect to the tuning data packet. If an error is found by means of the checking of the receiver data packet, the first and the second resistor are set to a default setting. If no error is found by means of the checking of the receiver data packet, the first and the second resistor are set to a second setting. A used flag corresponding to the first setting may be set in order to ensure that that same setting is not used again for the first setting during the tuning mode.

The first and the second transceiver may for example comprise an implementation of a transceiver circuit according to the improved concept.

The generating of the receiver data packet, the checking of the receiver data packet and the setting of the first and the second resistor to the default or the second setting are performed by means of the first transceiver.

In further implementations of the method, the second transceiver has a tunable third resistor coupled to the first capacitor and a tunable fourth resistor coupled to the second capacitor. Therein, the generation of the tuning signals is carried out by means of the first transceiver. In such implementations further receiver signals depending on the tuning signals are received by means of the second transceiver utilizing a third setting for the third and fourth resistor. A further receiver data packet is generated based on the further receiver signals.

The further receiver data packet is checked for errors with respect to the tuning data packet. If an error is found by means of the checking of the further receiver data packet, the third and the fourth resistor are set to the default setting. If no error is found by means of the checking of the receiver data packet, the third and fourth resistor are set to a fourth setting.

The generating of the further receiver data packet, the checking of the further receiver data packet and the setting of the third and the fourth resistor to the default setting or the fourth setting are performed by means of the second transceiver.

In such implementations, so to say the role of the first and the second transceiver are interchanged. In this way it becomes possible to generate the tuning signals by means of the second transceiver and to receive the transceiver signals by means of the first transceiver in an alternating fashion, generating the tuning signals by means of the first transceiver and receiving the receiver signals by means of the second transceiver. The third and the fourth setting may or may not correspond to the first and the second setting.

In further implementations of the method, at least the steps of generating the tuning signals, receiving the receiver signals, generating the receiver data packet, checking the receiver data packet and setting the first and the second resistor to the second setting or the default setting are performed repeatedly in a cyclic manner. If applicable, also the receiving of the further receiver signals, the generating of the further receiver data packet, the checking of the further receiver data packet and the setting of the third and the fourth resistor to the fourth setting or the default setting are performed repeatedly in a cyclic manner.

During a cycle, the first setting corresponds to the second setting of a preceding cycle or to the default setting. During the cycle, the second setting corresponds to the default setting or differs from the first setting of the cycle and from the first setting of any preceding cycle. Analogously, if applicable, during a cycle, the third setting corresponds to the fourth setting of a preceding cycle or to the default setting and the fourth setting corresponds to the default setting or differs from the third setting of the cycle and from the third setting of any preceding cycle.

In such implementations, the actions performed by the first transceiver and the second transceiver are performed alternatingly. In particular, in a cycle, the steps are for example performed in the following order:

i) generating the tuning signals by means of the second transceiver,
ii) receiving the receiver signals by means of the first transceiver utilizing the first setting,
iii) generating the receiver data packet, checking the receiver data packet for errors,
iv) setting the first and the second resistor to the default setting or the second setting,
v) generating the tuning signals by means of the first transceiver,
vi) receiving the further receiver signals by means of the second transceiver utilizing the third setting,
vii) generating the further receiver data packet, checking the further receiver data packet for errors,
viii) setting the third and the fourth resistor to the default setting or the fourth setting.

Then, the method may be started over with the step corresponding to step i), wherein in step ii) the first setting corresponds to the second setting of the preceding cycle or to the default setting, and in step vi) the third setting corresponds to the fourth setting of the preceding cycle or to the default setting.

In some implementations of the method, the default setting, the first setting and the second setting are comprised by a plurality of settings. During the cycle, the second setting is equal to the default setting if the second setting cannot be chosen from the plurality of settings differing from the first setting of the cycle and of any preceding cycle.

In such implementations, the method may be used to check receiver data packets corresponding to all settings of the plurality of settings for errors with respect to the tuning data packet. In this way, it becomes possible to select an optimal setting out of the plurality of settings. The optimal setting may for example ensure amplitudes of the receiver signals being larger than a defined minimum value.

According to the improved concept also a method for communication between a first transceiver and a second transceiver being capacitively coupled to the first transceiver via a first capacitor and a second capacitor is provided. The method comprises tuning resistor settings of the first transceiver and/or of the second transceiver utilizing an implementation of the method for tuning resistor settings described before. Then, optimal settings for the first, the second, the third and/or to fourth resistor are selected from the plurality of settings. Then, data is exchanged between the first transceiver and the second transceiver utilizing the optimal settings. The optimal settings may for example ensure amplitudes of the receiver signals being larger than a defined minimum value.

In several implementations of the method for communication between the first transceiver and the second transceiver, a discharge signal is generated indicating a ratio between a bit period of the tuning data packet and a discharge time of a capacitive coupling established by the first and the second capacitor and the first and the second resistor. A further discharge signal is generated, indicating a ratio between a bit period of the tuning packet and a further discharge time of a capacitive coupling established by the first and the second capacitor and the third and the fourth resistor.

In several implementations of the method for communication between the first transceiver and the second transceiver, the selection of the optimal settings is performed based on at least one of the discharge signal, a further discharge signal, a result of the checking of the receiver data packet for errors and a result of the checking of the further receiver data packet for errors.

In implementations wherein the result of the checking and for example, the discharge signal are utilized for example for selecting the optimal settings for the first and the second resistor, the back-end may for example generate check signals for each setting of the plurality of settings depending on the result of the checking. The check signals may for example assume a logic high value if no error is found by means of the checking corresponding to a respective setting and a logic low value if an error is found by means of the checking corresponding to the respective setting. The discharge signal may for example assume a logic high value if the discharge period is shorter than the bit period and a logic low value otherwise. The back-end may for example store the values of the discharge signal and the check signal for each of the settings.

Then, the optimal setting may for example be selected from those settings of the plurality of settings, for which both the respective check signal and the discharge signal feature a logic high value. A possible criterion for selecting the optimal settings may for be that amplitudes of the receiver signals are larger than a defined minimum value. In case the discharge signal does not feature a logic high value for any of the settings or features a logic high value for all of the settings, the optimal setting may be selected from those settings of the plurality of settings for which the respective check signal features a logic high value. In such case, the optimal setting may for example be selected as a setting being closest to an average value of the settings featuring a logic high value.

BRIEF DESCRIPTION OF THE DRAWINGS

In the following the improved concept is explained in detail with the aid of exemplary implementations by reference to the drawings. Components that are functionally identical or have an identical effect may be denoted by identical references. Identical components and/or components with identical effects may be described only with respect to the figure where they occur first; their description is not necessarily repeated in subsequent figures.

In the drawings.

DETAILED DESCRIPTION

Figure 1:
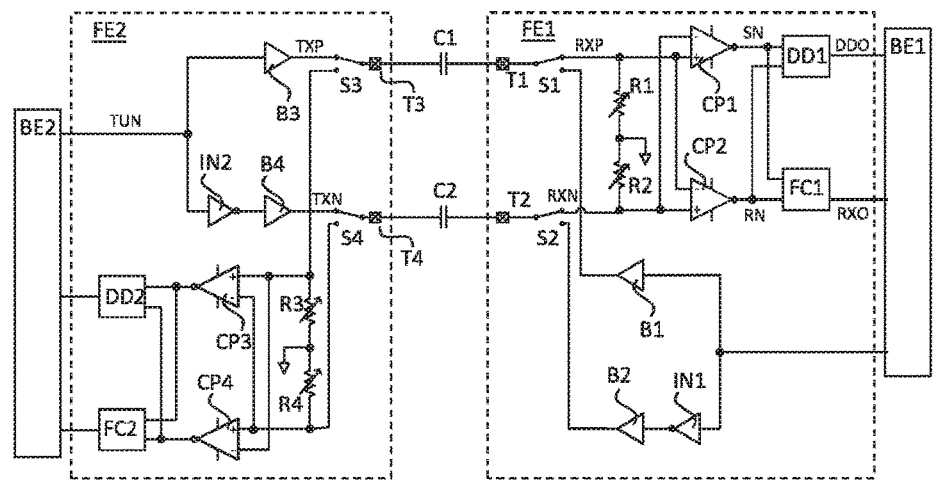
FIG. 1 shows an exemplary implementation of a transceiver circuit according to the improved concept.

FIG. 1 shows an exemplary implementation of the transceiver circuit according to the improved concept with a front-end FE1 and a back-end BE1.

The front-end FE1 comprises a first terminal T1 and a second terminal T2. The first terminal T1 is connected to a first capacitor C1, in particular to a first plate of the first capacitor C1, and the second terminal T2 is connected to a second capacitor C2, in particular to a first plate of the second capacitor C2. The front-end FE1 further comprises a tunable first resistor R1 connected via a first switch S1 between the first terminal T1 and a reference terminal VSS and a tunable second resistor R2 connected via a second switch S2 between the second terminal T2 and the reference terminal VSS.

The capacitors C1, C2 are for example implemented in a first and a second device. For example, the first plates of the capacitors C1, C2 may be comprised by the first device and the second plates of the capacitors C1, C2 may be comprised by the second device. Consequently, a capacitive coupling established by the capacitors C1, C2 may be detachable in the sense that by removing the first from the second device also the first plates are removed from the second plates. In particular, the arrangement of FIG. 1 may correspond to a detachable capacitively coupled communication system.

A first comparator CP1 is connected via a first non-inverting input and the first switch S1 to the first terminal T1 and via a first inverting input and the second switch S2 to the second terminal T2. A second comparator CP2 is connected via a second inverting input and the first switch S1 to the first terminal T1 and via a second non-inverting input and the second switch S2 to the second terminal T2.

The front-end FE1 further comprises a discharge detector DD1 connected via a first detector input to an inverting output of the first comparator CP1 and via a second detector input to an inverting output of the second comparator CP2. An output of the discharge detector DD1 is coupled to the back-end BE1. The front-end FE1 further comprises a combining flip-flop FC1 connected via a set input to the inverting output of the first comparator CP1 and via a reset input to the inverting output of the second comparator CP2. An output of the combining flip-flop FC1 is coupled to the back-end BE1.

The front-end FE1 further comprises a first buffer B1 coupled to the back-end BE1 and connected via the first switch S1 to the first terminal T1. The front-end FE1 also comprises a second buffer B2 connected in series with a first inverter IN1 and via the second switch S2 to the second terminal T2. The first inverter IN1 is coupled to the back-end BE1.

In FIG. 1, also a further transceiver circuit with a further front-end FE2 and a further back-end BE2 is shown. The further front-end FE2 comprises a third terminal T3 connected to the first capacitor C1, in particular to a second plate of the first capacitor C1 and a fourth terminal T4 connected to the second capacitor C2, in particular to a second plate of the second capacitor C2. The further front-end FE2 comprises a third resistor R3 connected via a third switch S3 between the third terminal T3 and a reference terminal VSS and a fourth resistor R4 connected via a fourth switch S4 between the fourth terminal T4 and the reference terminal VSS.

A third comparator CP3 is connected via a third non-inverting input and the third switch S3 to the third terminal T3 and via a third inverting input and the fourth switch S4 to the fourth terminal T4. A fourth comparator CP4 is connected via a fourth inverting input to the fourth terminal T4 and via a fourth non-inverting input to the fourth terminal T4.

The further front-end FE2 comprises a further discharge detector DD2 connected via a third detector input to an inverting output of the third comparator CP3 and via a fourth detector input to an inverting output of the fourth comparator CP4. An output of the further discharge detector DD2 is coupled to the further back-end BE2. The further front-end FE2 comprises a further combining flip-flop FC2 connected via a further reset input to the inverting output of the third comparator CP3 and via a further set input to the inverting input of the fourth comparator CP4. An output of the further combining flip-flop FC2 is coupled to the further back-end BE2.

The further front-end FE2 comprises a third buffer B3 coupled to the further back-end BE2 and connected via the third switch S3 to the third terminal T3. The further front-end FE2 also comprises a fourth buffer B4 connected in series with a second inverter IN2 and via the fourth switch S4 to the fourth terminal T4. The second inverter IN2 is coupled to the further back-end BE2.

The switches S1, S2 may be controlled by the back-end BE1, while the switches S3, S4 may be controlled by the further back-end BE2. In the shown example, the first switch S1 and the second switch S2 are in states connecting the first comparator CP1, the first resistor R1, the second comparator CP2 and the second resistor R2 to the first and the second terminal T1, T2, respectively. The first buffer element B1, the second buffer element B2 and the first inverter IN1 are disconnected from the first and the second terminal T1, T2, respectively.

The third switch S3 and the fourth switch S4 are in a state connecting the third comparator CP3, the third resistor R3, the fourth comparator CP4 and the fourth resistor R4 to the third and the fourth terminal T3, T4, respectively. The third buffer element B3, the fourth buffer element B4 and the second inverter IN2 are disconnected from the third and the fourth terminal T3, T4, respectively. Consequently, the transceiver circuit is in a receiver state and the further transceiver circuit is in a transmitter state.

The transceiver circuit and the further transceiver circuit may operate for example in a tuning mode of operation. The further back-end BE2 generates an input signal TUN representing a tuning data packet. The input signal may for example comprise a preamble, a payload portion and a redundancy portion. The preamble may contain a sequence of alternating logic high and logic low bits, that is a sequence of alternating logic high and logic low periods each with a length of a bit period Tbit. The redundancy portion may for example contain bits for performing a cyclic redundancy check.

By means of the third buffer B3, a first tuning signal TXP is generated based on the input signal TUN and provided to the third terminal T3. By means of inverting the input signal TUN and by means of the fourth buffer B4, a second tuning signal TXN is generated based on the input signal TUN and provided to the fourth terminal T4. Consequently, also the tuning signals TXN, TXP represent the tuning data packet. The front-end FE1 receives a first receiver signal RXP at the first terminal T1 and a second receiver signal RXN at the second terminal T2.

Therein, the receiver signals depend on capacitances of the first and the second capacitor C1, C2 as well as on resistances of the first and the second resistor R1, R2. For example, for the receiving of the receiver signals RXP, RXN, the resistors R1, R2 may be set to a first setting of a plurality of settings. The first setting may for example also correspond to a default setting of the plurality, for example in an initial cycle of the tuning mode.

The first receiver signal RXP is supplied to the first non-inverting input of the first comparator CP1 and to the second inverting input of the second comparator CP2. The second tuning signal RXN is supplied to the first inverting input of the first comparator CP1 and to the second non-inverting input of the second comparator CP2. By means of comparing the receiver signals RXP, RXN, the first and the second comparator CP1, CP2 generate a first comparator signal SN and a second comparator signal RN, respectively. Therein, the first and the second comparator CP1, CP2 are for example biased, such that the inverting outputs of the first and the second comparator CP1, CP2, output a logic high value in case the signals at the first inverting and the first non-inverting input or the second inverting and the second non-inverting input, respectively, are equal.

The comparator signals SN, RN are supplied to the first and the second detector input of the discharge detector DD1, respectively. Depending on the comparator signals SN, RN, the discharge detector DD1 determines whether a discharge time of a capacitive coupling established by the capacitors C1, C2 and the resistors R1, R2 is shorter or longer than the bit period Tbit of the tuning data packet. The discharge time may be a time period within which charges on or voltages across the capacitors C1, C2 drop from a value corresponding to logic high below a threshold value, in particular a threshold value of the comparators CP1, CP2. If the discharge time is shorter than the bit period Tbit, the discharge detector DD1 may for example generate the discharge signal DDO assuming a logic high value and, if the discharge time is longer than the bit period Tbit, the discharge detector may for example generate the discharge signal DDO assuming a logic low value. The discharge signal DDO is then supplied to the back-end BE1.

The first comparator signal SN is supplied for example to the set input of the combining flip-flop FC1 and the second comparator signal RN is for example supplied to the reset input of the combining flip-flop FC1. In this way, the combining flip-flop FC1 generates a receiver output signal RXO representing a receiver data packet and supplies the receiver output signal RXO to the back-end BE1. If the described data exchange was successful, the receiver output signal RXO is for example identical or identical up to a time shift to the input signal TUN. That is, the receiver data packet is for example identical or identical up to a time shift to the tuning data packet.

However, depending on the setting used for the resistors R1, R2, errors may have occurred resulting in errors in the receiver data packet with respect to the tuning data packet. Therefore, the back-end BE1 checks the receiver data packet for errors with respect to the tuning data packet. Depending on a result of the checking, the resistors R1, R2 may be set to a second setting of the plurality of settings or to the default setting. The checking may for example be carried out by a direct comparison of the receiver data packet with the tuning data packet. Alternatively or in addition, the checking may be carried out by means of cyclic redundancy checking. For more details on the method of tuning resistor settings it is referred for example to FIGS. 3 and 4.

Figure 2:
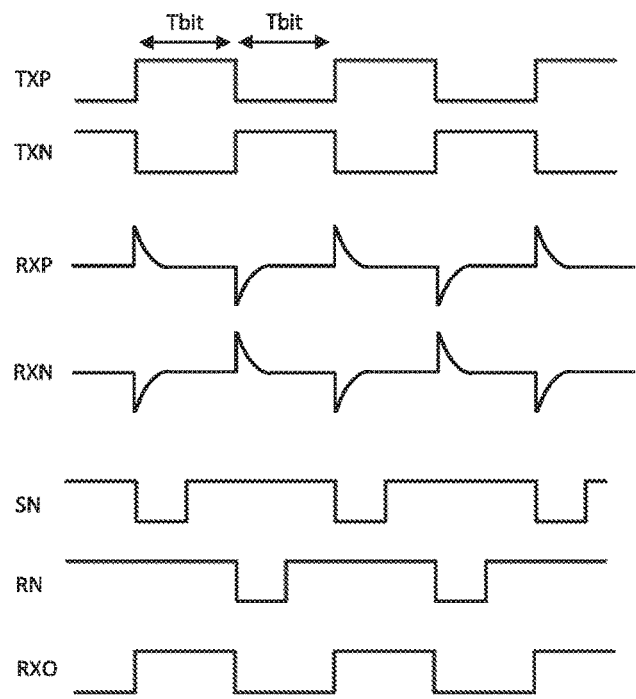
FIG. 2 shows a timing diagram of signals within an implementation of a transceiver circuit according to the improved concept.

FIG. 2 shows a timing diagram of signals within an implementation of the transceiver circuit according to the improved concept.

Shown are the tuning signals TXP, TXN, the receiver signals RXP, RXN, the comparators signals RN, SN and the receiver output signal RXO. In particular a sequence corresponding to the preamble is shown, as indicated by the arrows showing the bit period Tbit. The first tuning signal TXP and the second tuning signal TXN are for example inverted versions of each other. The first receiver signal RXP features a rising edge and a falling edge whenever the first tuning signal TXP features a rising edge or a falling edge, respectively. The second receiver signal RXN features a rising edge and a falling edge whenever the second tuning signal TXP features a rising edge or a falling edge, respectively.

Each rising edge of the first receiver signal RXP is followed by a decreasing curve indicating a discharging of positive or negative charge of the first capacitor C1. Each falling edge of the first receiver signal RXP is followed by an increasing curve indicating a discharging of negative or positive charge of the first capacitor C1. Each rising edge of the second receiver signal RXN is followed by a decreasing curve indicating a discharging of positive or negative charge of the second capacitor C2. Each falling edge of the second receiver signal RXN is followed by an increasing curve indicating a discharging of negative or positive charge of the second capacitor C2.

The shapes of the decreasing and increasing curves featured by the receiver signals RXP, RXN depend for example on a setting of the resistors R1, R2. In the shown example, the discharge time is shorter than the bit period Tbit.

The first comparator signal SN is generated by the first comparator CP1 and assumes a logic high value whenever the second receiver signal RXN is larger than the first receiver signal RXP and whenever the receiver signals RXP, RXN are equal. The first comparator signal SN assumes a logic low value whenever the first receiver signal RXP is larger than the second receiver signal RXN. The second comparator signal RN is generated by the second comparator CP2 and assumes a logic high value whenever the first receiver signal RXP is larger than the second receiver signal RXN and whenever the receiver signals RXP, RXN are equal. The second comparator signal RN assumes a logic low value whenever the second receiver signal RXN is larger than the second receiver signal RXP.

The receiver output signal RXO is generated by the combining flip-flop FC1, wherein the first comparator signal SN acts as a set signal and the second comparator signal RN acts as a reset signal for the combining flip-flop FC1. Consequently, the receiver output signal RXO is identical to the tuning signals TXP, TXN up to respective time shifts.

In the shown example, the data exchange was successful and the back-end BE1 does for example not find an error in the checking of the receiver data packet with respect to the tuning data packet. Consequently, in such a case the resistors R1, R2 may for example be set to the second setting.

Figure 3:
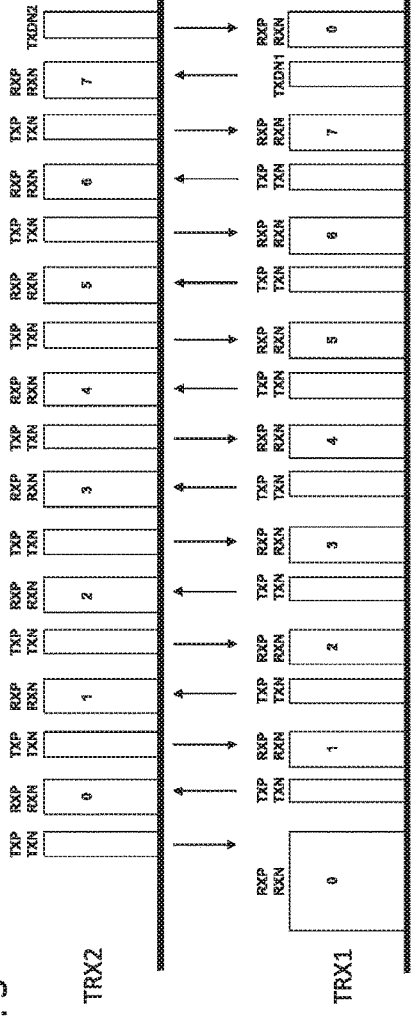
FIG. 3 shows a visualization of an implementation of a method for tuning resistor settings according to the improved concept.

FIG. 3 shows a visualization of an implementation of a method for tuning resistor settings according to the improved concept. The upper part of FIG. 3 represents a first transceiver TRX1, the lower part of represents a second transceiver TRX2 capacitively coupled to the first transceiver TRX1 via a first capacitor C1 and a second capacitor C2. The first transceiver TRX1 comprises a transceiver circuit according to the improved concept, for example the transceiver circuit shown in FIG. 1. The second transceiver TRX2 comprises a transceiver circuit according to the improved concept, for example the further transceiver circuit shown in FIG. 1. The first and the second transceiver TRX1, TRX2 are operated in the tuning mode of operation.

The boxes in FIG. 3 labeled with the tuning signals TXP, TXN represent tuning data packets generated by the first transceiver TRX1 and the second transceiver TRX2, respectively. The boxes labeled with the receiver signals RXP, RXN represent receiver data packets received by the first transceiver TRX1 and the second transceiver TRX2, respectively. The numerals in the blocks representing the receiver data packets stand for the settings for the first and the second resistor R1, R2 and the settings for the third and the fourth resistor R3, R4. Therein, the numeral 0 represents the default setting.

Starting with the first box in the upper part, the second transceiver TRX2 generates the tuning data package. Then, corresponding to the first box in the lower part, the first transceiver TRX1 receives the receiver signals RXP, RXN, utilizing the default setting as a first setting for the first and the second resistor. The first receiver TRX1 then generates the receiver data packet based on the receiver signals RXP, RXN. The first transceiver TRX1 checks the receiver data packet for errors with respect to the tuning data packet. In the present case no error is found by means of the checking and consequently the first and the second resistor R1, R2 are set to a second setting indicated by the numeral 1.

Then, the first and the second transceiver TRX1, TRX2 so to say switch their roles. The first transceiver TRX1 generates the tuning data packet as indicated by the second box on the lower part. The second transceiver TRX2 receives the receiver data signals RXP, RXN utilizing the default setting as a first setting. The second transceiver TRX2 generates the receiver data packet based on the receiver signals RXP, RXN and checks the receiver data packet for errors with respect to the tuning data packet. Again, no error is found by means of the checking and consequently the third and the fourth resistor are set to the second setting indicated by the numeral 1.

In a following cycle, again the second transceiver generates the tuning signals TXP, TXN and the first transceiver TRX1 receives the receiver signals RXP, RXN, this time utilizing the second setting of the previous cycle, namely the setting indicated with numeral 1, as a first setting. The generating and checking of the receiver data packet is performed as before and again no error is found by means of the checking. Therefore, the first and the second resistor R1, R2 are set to a second setting indicated by numeral 2.

In the same manner, the first and the second transceiver TRX1, TRX2 generate the tuning signals TXP, TXN alternatingly and receive the receiver signals RXP, RX alternatingly using different settings of a plurality of settings for the first and the second resistor R1, R2 and for the third and the fourth resistor R3R4, respectively. In the present example, the plurality of settings comprises eight different settings indicated by the numerals 0-7, including the default setting. In the present example no error is found by means of the checking of the receiver data packet for all of the settings of the plurality of settings being used as a first setting according to the method.

After all settings of the plurality of settings have been checked in the described way with respect to the first transceiver TRX1, an optimal setting is selected for the first and the second resistor R1, R2. The first transceiver TRX1 generates finish signals TXDN1 representing a finish data packet. The finish data packet contains the same information as the tuning data packet and may for example contain additional information. The additional information may for example comprise information about for which of the settings of the plurality of settings for the first and the second resistor R1, R2 an error was found by means of the checking of the receiver data packet and for which of the settings no error was found. The additional information may for example also contain information about the optimal setting.

After all settings of the plurality of settings have been checked in the described way with respect to the second transceiver TRX2, an optimal setting is selected for the third and the fourth resistor R3, R4. The second transceiver TRX2 generates further finish signals TXDN2 representing a further finish data packet. The further finish data packet contains the same information as the tuning data packet and may for example contain further additional information. The further additional information may for example comprise information about for which of the settings of the plurality of settings for the third and the fourth resistor R3, R4 an error was found by means of the checking of the receiver data packet and for which of the settings no error was found. The further additional information may for example also contain information about the optimal setting.

Figure 4:
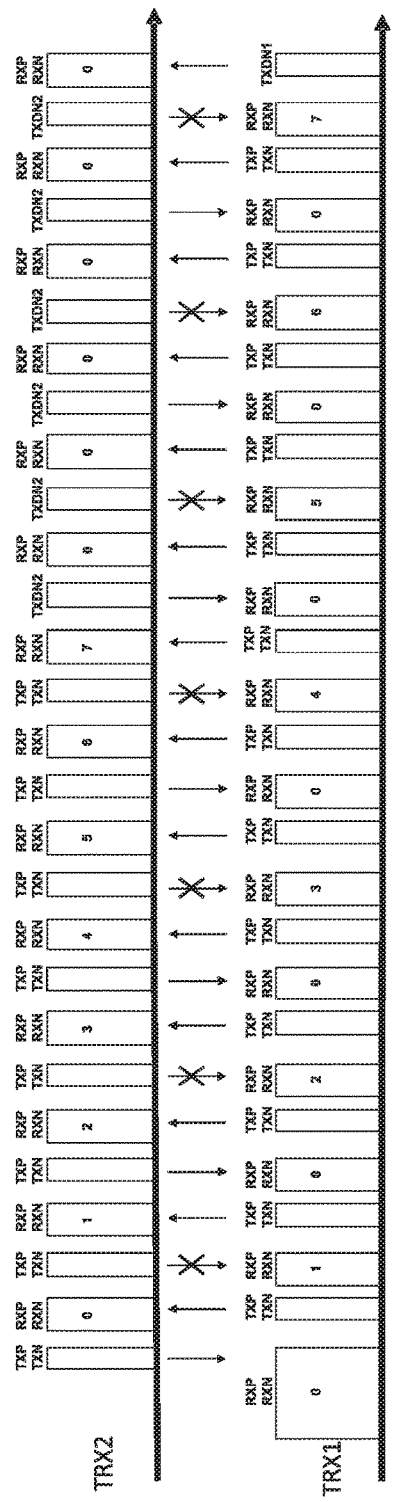
FIG. 4 shows a further visualization of an implementation of a method for tuning resistor settings according to the improved concept.

FIG. 4 shows a further visualization of a further implementation of a method for tuning resistor settings according to the improved concept.

A difference between the visualizations of FIGS. 3 and 4 is that in FIG. 3 no errors are found by means of the checking of the receiver data packet for all of the settings of the plurality of settings being used as a first setting according to the method. In FIG. 4, this remains unchanged for the receiving of the receiver signals RXP, RXN by means of the second transceiver TRX2. For receiving of the receiver signals RXP, RXN by means of the first transceiver TRX1, all settings of the plurality of settings, except for the default setting, lead to an error in the respective checking. This is indicated by the crossed out arrows from TRX2 to TRX1 between the respective boxes.

As for FIG. 3, the second transceiver TRX2 begins generating the tuning data package. The first transceiver TRX1 receives the receiver signals RXP, RXN utilizing the default setting as a first setting for the first and the second resistor. The first receiver TRX1 then generates the receiver data packet based on the receiver signals RXP, RXN. The first transceiver TRX1 checks the receiver data packet for errors with respect to the tuning data packet. In the present case no errors found by means of the checking and consequently, the first and the second resistor R1, R2 are set to a second setting indicated by the numeral 1.

Then, the first transceiver TRX1 generates the tuning data packet. The second transceiver TRX2 receives the receiver data signals RXP, RXN utilizing the default setting as a first setting. The second transceiver TRX2 generates the receiver data packet based on the receiver signals RXP, RXN and checks the receiver data packet for errors with respect to the tuning data packet. Again, no errors found by means of the checking and consequently the third and the fourth resistor are set to a second setting indicated by the numeral 1.

In a following cycle, again the second transceiver TRX2 generates the tuning signals TXP, TXN and the first transceiver TRX1 receives the receiver signals RXP, RXN, this time utilizing the second setting of the previous cycle, namely the setting indicated with numeral 1, as a first setting. The generating and checking of the receiver data packet is performed as before. This time, however, an error is found by means of the checking. Therefore the first and the second resistor R1, R2 are set to the default setting again.

In the same manner, the first and the second transceiver TRX1, TRX2 generate the tuning signals TXP, TXN alternatingly and receive the receiver signals RXP, RX alternatingly. Therein, no error is found by means of the checking of the receiver data packet by the second transceiver TRX2 for all of the settings of the plurality of settings being used as a first setting for the third and the fourth resistor R3, R4, respectively. On the other hand, for each of the settings of the plurality of settings, except for the default setting, being used as a first setting for the first and the second resistor R1, R2, an error is found by means of the checking by the first transceiver TRX1. Therefore, every second time the first transceiver TRX1 is receiving the receiver signals RXP, RXN, the default setting is used as a first setting.

Due to the described circumstances, the second transceiver TRX2 has checked all settings of the plurality of settings several cycles before the first transceiver has checked all the settings of the plurality. In the remaining cycles, during which the first transceiver TRX1 continues checking the remaining settings, the second transceiver TRX2 may for example always utilize the default setting for receiving the receiver signals RXP, RXN. During these remaining cycles, the second transceiver may for example generate the further finish signals TXDN2 instead of generating the tuning signals TXP, TXN.

After all settings of the plurality of settings have been checked in the described way with respect to the first transceiver TRX1, the first transceiver TRX1 generates the finish signals TXDN1. The additional information contained by the finish signals TXDN1 may for example comprise information about for which of the settings of the plurality of settings for the first and the second resistor R1, R2 an error was found by means of the checking of the receiver data packet and for which of the settings no error was found.

Figure 5:
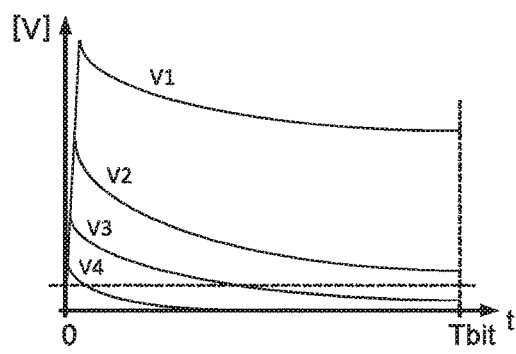
FIG. 5 shows a voltage across a capacitor in an implementation of a transceiver circuit according to the improved concept as a function of time for different resistor settings.

FIG. 5 shows a voltage across a capacitor in an implementation of the transceiver circuit according to the improved concept as a function of time for different resistor settings.

Shown are curves V1, V2, V3, V4 representing a voltage V across for example the first capacitor C1 and/or the second capacitor C2 as a function of time t. The resistor settings and consequently the discharge times corresponding to the curves V1, V2, V3, V4 are for example different for each of the curves V1, V2, V3, V4. The bit period Tbit of the tuning data package is indicated on the t-axis. A dashed horizontal line marks a threshold value, for example a threshold value of the comparators CP1, CP2. The comparators CP1, CP2 may for example be not capable of resolving a voltage difference smaller than the threshold value.

The first curve V1 corresponds to a discharge time being significantly larger than the bit period Tbit. The second curve V2 corresponds to a discharge time being slightly larger than the bit period Tbit. The third curve V3 corresponds to a discharge time being slightly shorter than the bit period Tbit and the fourth curve V4 corresponds to a discharge time being significantly shorter than the bit period Tbit. Therein, the discharge time corresponds to the time when the respective curve cuts the dashed line.

In an optimal case, the discharge time may for example be shorter than the bit period Tbit, but not significantly smaller. For example the third curve V3 may represent such a case.

Figure 6:
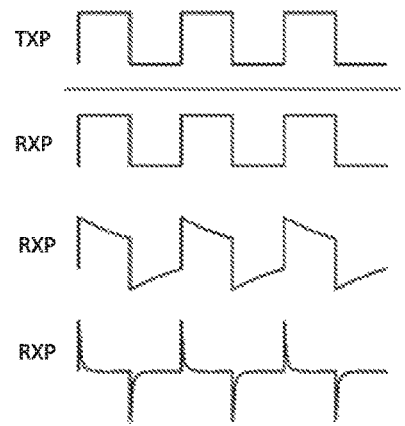
FIG. 6 shows a further timing diagram of signals within an implementation of the transceiver circuit according to the improved concept.

FIG. 6 shows a further timing diagram of signals within an implementation of the transceiver circuit according to the improved concept.

Shown are the first tuning signal TXP and three versions of the first receiver signal RXP, each version corresponding to a different discharge time the first capacitor C1 and/or the second capacitor C2.

The uppermost version of the first receiver signal RXP corresponds to a discharge time being significantly larger than the bit period Tbit. This results in negligible distortions of the signal. However, such configuration may be disadvantageous since it might complicate a separation of individual bits in a data exchange. For example, if two logic high bits follow each other, a separation of the bits may be not detectable.

The middle version of the first receiver signal RXP corresponds to a discharge time being approximately equal to the bit period Tbit. This results in significant distortions of the signal. The lowermost version of the first receiver signal RXP corresponds to a discharge time being significantly smaller than the bit period Tbit. This results in very strong distortions of the signal.

What was described for the first tuning signal TXP and the first receiver signal RXP holds in an analog way for the second tuning signal TXN and the second receiver signal RXN. In an optimal case, the discharge time may for example be shorter than the bit period Tbit, but not significantly shorter.

Figure 7:
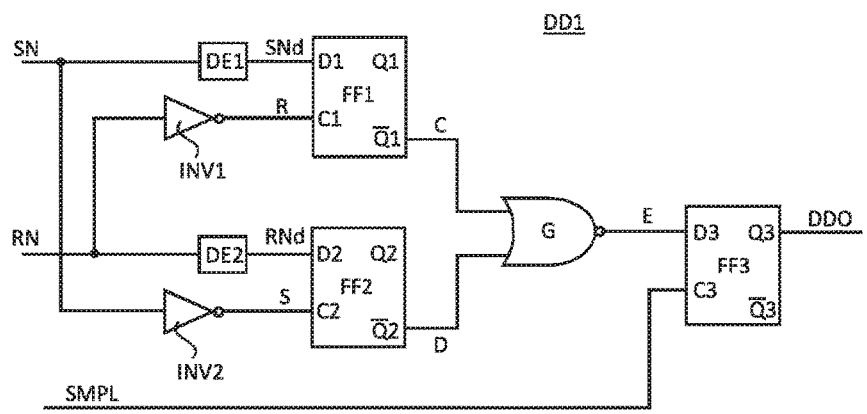
FIG. 7 shows an implementation of a discharge detector to be used in a transceiver circuit according to the improved concept.

FIG. 7 shows an implementation of a discharge detector to be used in the transceiver circuit according to the improved concept. Shown is the discharge detector DD1, however, also the further discharge detector DD2 may be implemented in the same way.

The discharge detector DD1 comprises a first flip-flop FF1, a second flip-flop FF2 and a third flip-flop FF3. Furthermore, the discharge detector DD1 comprises a gate G, a first delay element DE1, a second delay element DE2, a first discharge inverter INV1 and a second discharge inverter INV2.

The first delay element DE1 is connected between the first detector input and a first data input D1 of the first flip-flop FF1. The second delay element DE2 is connected between the second detector input and a second data input D2 of the second flip-flop FF2. The first discharge inverter INV1 is connected between the second comparator output and the first clock input of the first flip-flop FF1. The second discharge inverter INV2 is connected between the first comparator output and the second clock input of the second flip-flop FF2.

In the shown example, the gate G is implemented for example as a NOR gate. A first input of the gate G is connected to a first inverted output $\overline{Q1}$ of the first flip-flop FF1 and a second input of the gate G is connected to a second inverted output $\overline{Q2}$ of the second flip-flop FF2. A third data input D3 of the third flip-flop FF3 is connected to an inverted output of the gate G and a third clock input C3 of the third flip-flop FF3 is supplied with a sample signal SMPL provided by the back-end BE1.

The first discharge inverter INV1 generates a first clock signal R by inverting the second comparator signal RN and the second discharge inverter INV2 generates a second clock signal S by inverting the first comparator signal SN. The first delay element DE1 generates a delayed first comparator signal SNd by delaying the first comparator SN signal by a delay. The second delay element DE2 generates a delayed second comparator signal RNd by delaying the second comparator signal RN by the delay. Therein, the delay may be relatively short, for example may be comparable to a switching time of the comparators CP1, CP2.

The first flip-flop FF1 generates a first flip-flop signal C for example at the first inverted output $\overline{Q1}$, wherein the first clock signal R samples the delayed first comparator signal SNd for example at rising edges of the first clock signal R. The second flip-flop FF2 generates a second flip-flop signal D for example at the second inverted output $\overline{Q2}$, wherein the second clock signal S samples the delayed second comparator signal RNd for example at rising edges of the second clock signal S.

The gate G then generates a result signal E, combining the flip-flop signals C, D for example by means of a NOR combination. The third flip-flop FF3 generates the discharge signal DDO for example at a third non-inverted output Q3 by means of sampling the result signal E with respect to rising edges of the sample signal SMPL.

In the described manner, the shown discharge detector DD1 generates the discharge signal DDO indicating the ratio between the bit period Tbit and the discharge time of the capacitive coupling established by the first and the second capacitor and the first and the second resistor. In the shown example, the discharge signal DDO assumes a logic high value if the discharge time is shorter than the bit period Tbit and the third flip-flop FF3 is triggered by a rising edge of the sample signal SMPL. For more details it is referred to the description of FIGS. 8 and 9.

Figure 8:
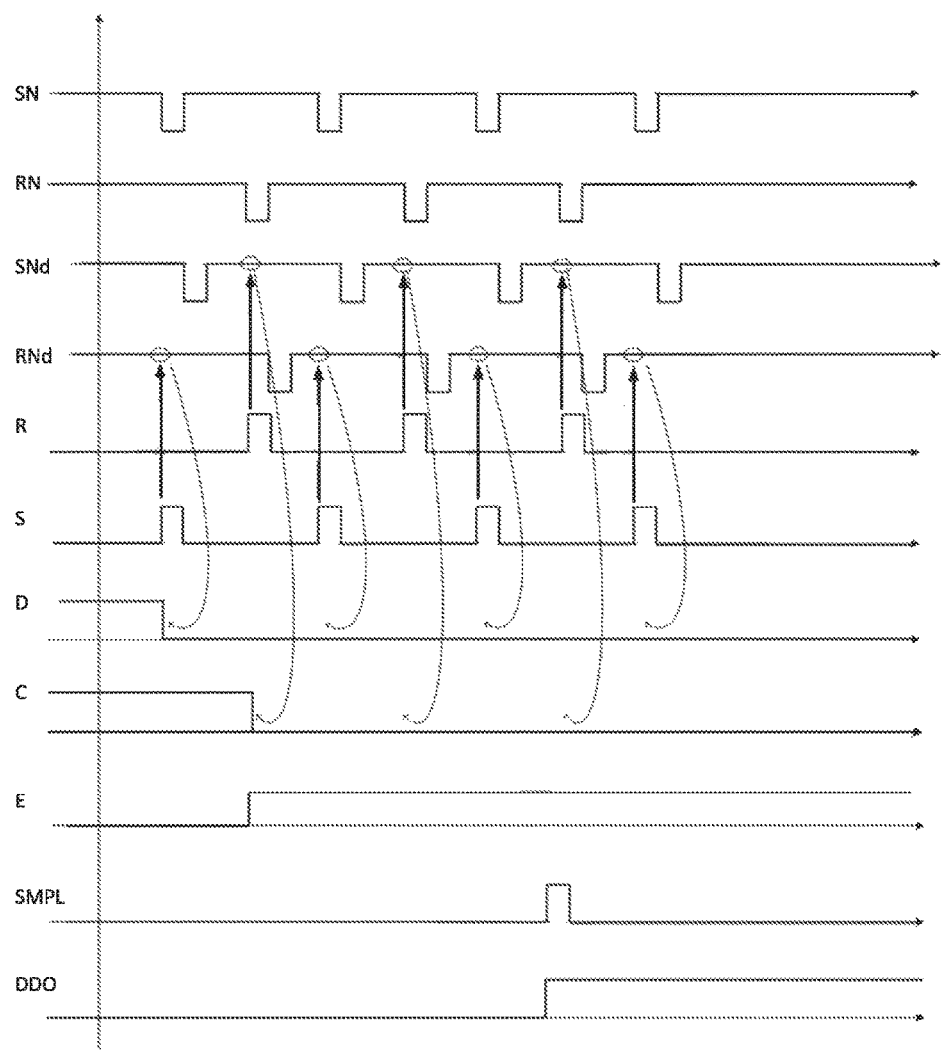
FIG. 8 shows a timing diagram of signals within a discharge detector to be used in a transceiver circuit according to the improved concept.

FIG. 8 shows a timing diagram of signals within a discharge detector DD1 to be used in the transceiver circuit according to the improved concept. The discharge detector DD1 may for example correspond to a discharge detector DD1 implemented as shown in FIG. 7.

In the example of FIG. 8, the discharge time is shorter than the bit period Tbit. Furthermore, the shown signal sequence corresponds to the preamble, wherein the tuning signals TXP, TXN contain a sequence of alternating logic high and logic low periods, each with a length of the bit period Tbit. Consequently, the comparator signals SN, RN feature logic high periods being longer than the bit period Tbit and logic low values being shorter than the bit period Tbit. The delayed comparator signals SNd, RNd are delayed with respect to the comparator signals SN, RN by a delay defined for example by the delay elements DE1, DE2 as shown in FIG. 7. The delay may for example be included to avoid a sampling at falling or rising edges.

The clock signals R, S are inverted versions of the comparator signals RN, SN and sample the delayed comparator signals SNd, RNd by means of their rising edges. This may for example be performed by means of the first and the second flip-flop FF1, FF2, as shown in FIG. 7. In the present case of the discharge time being shorter than the bit period Tbit, the delayed comparator signals SNd, RNd are for example in logic high states at the sampling instance. Consequently, the first flip-flop signal C is set from logic high to logic low at the first sampling instant of the first clock signal R. Analogously, the second flip-flop signal D is set from logic high to logic low at the first sampling instant of the second clock signal S.

The flip-flop signals C, D are combined by means of an NOR combination, for example by the gate G, resulting in the result signal E assuming a logic high value after the first sampling instant of the first clock signal R, that is when the flip-flop signals C, D both have assumed the logic low value. The discharge signal DDO remains at logic low until the sample signal SMPL, for example generated by the back-end BE1, features a rising edge, for example of a logic high pulse. Then, the rising edge of the sample signal SMPL samples the result signal E, for example by means of the third flip-flop FF3, causing the discharge signal DDO to assume a logic high value.

Consequently, the discharge signal DDO being in the logic high state indicates that the discharge time is shorter than the bit period Tbit.

Figure 9:
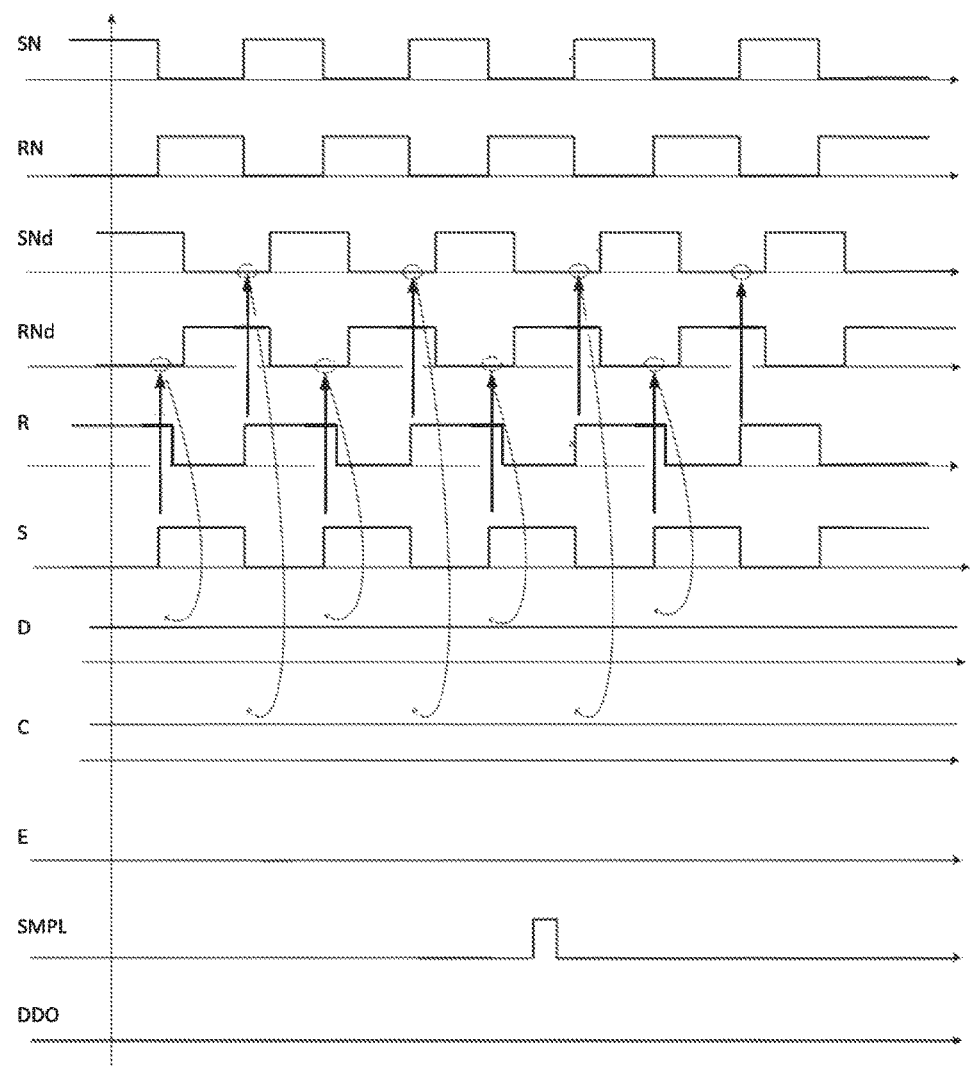
FIG. 9 shows a further timing diagram of signals within a discharge detector to be used in a transceiver circuit according to the improved concept.

FIG. 9 shows a further timing diagram of signals within a discharge detector to be used in the transceiver circuit according to the improved concept.

As for FIG. 8, the shown signal sequence of FIG. 9 corresponds to the preamble of the tuning data packet, wherein the tuning signals TXP, TXN contain a sequence of alternating logic high and logic low periods, each with a length of the bit period Tbit. In contrast to FIG. 8, however, the discharge time is larger than the bit period Tbit in the case of FIG. 9. Consequently, the comparator signals RN, SN feature logic high periods being as long as the bit period Tbit and logic low values being as long as the bit period Tbit.

The clock signals R, S sample the delayed comparator signals SNd, RNd by means of their rising edges. In the present case of the discharge time being longer than the bit period Tbit, the delayed comparator signals SNd, RNd are for example in logic low states at the sampling instances. Consequently, the first flip-flop signal C and the second flip-flop signal D remain at logic high throughout the shown sequence.

Therefore, also the result signal E remains at logic low throughout the sequence. When the sample signal features the rising edge, the result signal E is sampled, resulting in the discharge signal DDO remaining and logic low as well. Consequently, the discharge signal DDO being in the logic low state indicates that the discharge time is longer than the bit period Tbit.

The invention claimed is:

1. A transceiver circuit with a front-end and a back-end, the front-end comprising:
   a first terminal and a second terminal for coupling to a first capacitor and to a second capacitor, respectively;
   a tunable first resistor coupled between the first terminal and a reference terminal; and
   a tunable second resistor coupled between the second terminal and the reference terminal,
   wherein the front-end is configured to, during a tuning mode of operation,
      receive receiver signals at the first and the second terminal utilizing a first setting for the first and the second resistor, and
      generate a receiver data packet based on the receiver signals, wherein the back-end is configured to, during the tuning mode,
   check the receiver data packet for errors with respect to a defined tuning data packet,
   if an error is found with the checking, set the first and the second resistor to a default setting, and
   if no error is found with the checking, set the first and the second resistor to a second setting,
   wherein the tuning mode of operation is separate from a normal mode of operation for the transceiver circuit, and
   wherein, during the tuning mode of operation, the first resistor and the second resistor are set to the default setting or to the second setting for operating the transceiver circuit in the normal mode of operation.

2. The transceiver circuit according to claim 1, wherein the front-end further comprises:
   a first comparator configured to generate a first comparator signal at a first comparator output depending on the receiver signals;
   a second comparator configured to generate a second comparator signal at a second comparator output depending on the receiver signals; and
   wherein the front-end is configured to generate the receiver data packet based on the first and the second comparator signal.

3. The transceiver circuit according to claim 2, wherein the first comparator comprises a first non-inverting input coupled to the first terminal and a first inverting input coupled to the second terminal, and
   wherein the second comparator comprises a second non-inverting input coupled to the second terminal and a second inverting input coupled to the first terminal.

4. The transceiver circuit according to claim 2, wherein the front-end further comprises a combining flip-flop configured and arranged to generate the receiver data packet by generating a receiver output signal based on the first and the second comparator signal and to supply the receiver output signal to the back-end (BE1).

5. The transceiver circuit according to claim 2, wherein the front-end further comprises a discharge detector configured and arranged to:
   generate, based on the first and the second comparator signal, a discharge signal indicating a ratio between a bit period of the tuning data packet and a discharge time of a capacitive coupling established by the first and the second capacitor and the first and the second resistor; and supply the discharge signal to the back-end.

6. The transceiver circuit according to claim 5, wherein the discharge detector comprises:
a first flip-flop comprising a first data input for receiving a delayed first comparator signal and a first clock input for receiving a first clock signal and configured to generate a first flip-flop signal;
a second flip-flop comprising a second data input for receiving a delayed second comparator signal and a second clock input for receiving a second clock signal and configured to generate a second flip-flop signal; and
a gate configured and arranged to generate a result signal based on the first and the second flip-flop signal.

7. The transceiver circuit according to claim 6, wherein the discharge detector further comprises:
a first delay element coupled between the first comparator output and the first data input and configured to generate the delayed first comparator signal by delaying the first comparator signal; and
a second delay element coupled between the second comparator output and the second data input and configured to generate the delayed second comparator signal by delaying the second comparator signal.

8. The transceiver circuit according to claim 6, wherein the discharge detector further comprises:
a first discharge inverter coupled between the second comparator output and the first clock input and configured to generate the first clock signal by inverting the second comparator signal; and
a second discharge inverter coupled between the first comparator output and the second clock input and configured to generate the second clock signal by inverting the first comparator signal.

9. The transceiver circuit according to claim 6, wherein the discharge detector further comprises a third flip-flop with a third data input for receiving the result signal and a third clock input for receiving a sample signal from the back-end and configured to generate the discharge signal.

10. A method for tuning resistor settings of a communication system with a first transceiver capacitively coupled to a second transceiver via a first capacitor and a second capacitor, the first transceiver having a tunable first resistor coupled to the first capacitor and a tunable second resistor coupled to the second capacitor, wherein the method comprises:
operating the first and the second transceiver in a tuning mode of operation;
generating tuning signals representing a tuning data packet by employing the second transceiver;
receiving receiver signals depending on the tuning signals by employing the first transceiver utilizing a first setting of a plurality of settings for the first and the second resistor;
generating a receiver data packet based on the receiver signals;
checking the receiver data packet for errors with respect to the tuning data packet;
if an error is found by means of the checking of the receiver data packet, setting the first and the second resistor to a default setting of the plurality of settings; and if no error is found by means of the checking of the receiver data packet, setting the first and the second resistor to a second setting of the plurality of settings,
wherein the tuning mode of operation is separate from a normal mode of operation for operating the first transceiver and the second transceiver, and
wherein, during the tuning mode of operation, the first resistor and the second resistor are set to the default setting or to the second setting for operating the first transceiver and the second transceiver in the normal mode of operation.

11. The method according to claim 10, further comprising:
generating a first comparator signal depending on the receiver signals; and
generating a second comparator signal depending on the receiver signals,
wherein receiver data packet is generated based on the first and the second comparator signal.

12. The method according to claim 10, wherein the second transceiver has a tunable third resistor coupled to the first capacitor and a tunable fourth resistor coupled to the second capacitor, and wherein the method further comprises:
generating the tuning signals representing the tuning data packet by employing the first transceiver;
receiving further receiver signals depending on the tuning signals by employing the second transceiver utilizing a third setting for the third and the fourth resistor;
generating a further receiver data packet based on the further receiver signals;
checking the further receiver data packet for errors with respect to the tuning data packet;
if an error is found by means of the checking of the receiver data packet, setting the third and the fourth resistor to the default setting; and
if no error is found by means of the checking of the receiver data packet, setting the third and the fourth resistor to a fourth setting.

13. The method according to claim 10, wherein at least the steps of generating the tuning signals receiving the receiver signals, generating the receiver data packet, checking the receiver data packet and setting the first and the second resistor to the second setting or the default setting are performed repeatedly in a cyclic manner,
wherein during a cycle, the first setting corresponds to the second setting of a preceding cycle or to the default setting, and
wherein during the cycle, the second setting corresponds to the default setting or differs from the first setting of the cycle and of any preceding cycle.

14. The method according to claim 13, wherein during the cycle the second setting is equal to the default setting if the second setting cannot be chosen from the plurality of settings differing from the first setting of the cycle and of any preceding cycle.

15. The method according to claim 10, further comprising:
generating a discharge signal indicating a ratio between a bit period Tbit of the tuning data packet and a discharge time of a capacitive coupling established by the first and the second capacitor and the first and the second resistor.

16. A method for communication between a first transceiver and a second transceiver capacitively coupled to the first transceiver via a first capacitor and a second capacitor, wherein the first transceiver has a tunable first resistor coupled to the first capacitor and a tunable second resistor coupled to the second capacitor, and wherein the second transceiver has a tunable third resistor coupled to the first capacitor and a tunable fourth resistor coupled to the second capacitor, the method comprising:
- operating the first and the second transceiver in a tuning mode of operation;
- generating tuning signals representing a tuning data packet by employing the second transceiver;
- receiving receiver signals depending on the tuning signals by employing the first transceiver utilizing a first setting of a plurality of settings for the first and the second resistor;
- generating a receiver data packet based on the receiver signals;
- checking the receiver data packet for errors with respect to the tuning data packet;
- if an error is found by means of the checking of the receiver data packet, setting the first and the second resistor to a default setting of the plurality of settings;
- if no error is found by means of the checking of the receiver data packet, setting the first and the second resistor to a second setting of the plurality of settings;
- generating the tuning signals representing the tuning data packet by employing the first transceiver;
- receiving further receiver signals depending on the tuning signals by employing the second transceiver utilizing a third setting for the third and the fourth resistor;
- generating a further receiver data packet based on the further receiver signals;
- checking the further receiver data packet for errors with respect to the tuning data packet;
- if an error is found by means of the checking of the further receiver data packet, setting the third and the fourth resistor to the default setting;
- if no error is found by means of the checking of the further receiver data packet, setting the third and the fourth resistor to a fourth setting;
- selecting from the plurality of settings optimal settings for the first, the second, the third and/or the fourth resistor; and
- exchanging data between the first transceiver and the second transceiver utilizing the optimal settings.

17. The method according to claim 16, further comprising:
- generating a discharge signal indicating a ratio between a bit period Tbit of the tuning data packet and a discharge time of a capacitive coupling established by the first and the second capacitor and the first and the second resistor; and
- generating a further discharge signal indicating a ratio between the bit period Tbit and a further discharge time of a capacitive coupling established by the first and the second capacitor and the third and the fourth resistor.

18. The method according to claim 16, wherein the selection of the optimal settings is performed based on at least one of:
- a result of the checking of the receiver data packet for errors, and
- a result of the checking of the further receiver data packet for errors.

19. The method according to claim 17, wherein the selection of the optimal settings is performed based on at least one of:
- the discharge signal,
- the further discharge signal,
- a result of the checking of the receiver data packet for errors, and
- a result of the checking of the further receiver data packet for errors.

* * * * *